United States Patent [19]
Holmes et al.

[11] 3,843,018
[45] Oct. 22, 1974

[54] PNEUMATIC METERING DEVICE
[75] Inventors: Robert G. Holmes, Cary; Roger P. Rohrbach, Raleigh, both of N.C.
[73] Assignee: Research Corporation, New York, N.Y.
[22] Filed: June 26, 1970
[21] Appl. No.: 50,186

[52] U.S. Cl. ............................................. 221/211
[51] Int. Cl. ............................................ B65g 47/14
[58] Field of Search ....... 221/210, 211, 278; 294/64

[56] References Cited
UNITED STATES PATENTS
2,960,258 11/1960 Dodwell .......................... 221/211
3,466,079 9/1969 Mammel ........................... 294/64

*Primary Examiner*—Stanley H. Tollberg
*Attorney, Agent, or Firm*—Stowell & Stowell

[57] ABSTRACT

Apparatus is provided for metering discrete particles by utilizing a high velocity, low volume positive pressure air jet to retain a particle in a generally cylindrical cavity and releasing the retained particle by interrupting the air jet or directing a second jet of air into the cavity normal to the high velocity air jet.

6 Claims, 3 Drawing Figures

PATENTED OCT 22 1974

INVENTORS
ROBERT G. HOLMES &
ROGER P. ROHRBACH

BY *Stowell & Stowell*

ATTORNEYS

INVENTORS
ROBERT G. HOLMES &
ROGER P. ROHRBACH

BY Stowell & Stowell

ATTORNEYS

PNEUMATIC METERING DEVICE

The present invention is directed to an improved metering device for positively selecting and retaining single discrete articles from a plurality or mixture of articles and conveying the article to a release zone remote from the plurality of articles.

It is a further object of the present invention to provide such a device including means for positively releasing the discrete articles at the release zone.

It is a further particular object to provide such a device wherein a high velocity, low volume air jet comprises the article retaining means to thereby reduce to a minimum clogging of vacuum ports and the like often encountered in negative pressure vacuum metering systems.

Another object of the present invention is to provide such a device particularly adapted for seed handling and metering wherein the likelihood of damage to the seeds is materially reduced over prior art structures.

These and other objects and advantages will become apparent to those skilled in the art from the following detailed description of the invention which in general terms comprises apparatus for metering discrete particulate materials comprising, means forming a materials conveying cavity; means for directing a low volume, high velocity gas stream to the cavity, means for transporting said cavity through a zone of the materials to be conveyed, to a discharge zone, and means for positively releasing the particle retained in the cavity in the discharge zone.

The invention will be more particularly described in reference to the accompanying drawing wherein.

Figures 1, 3:
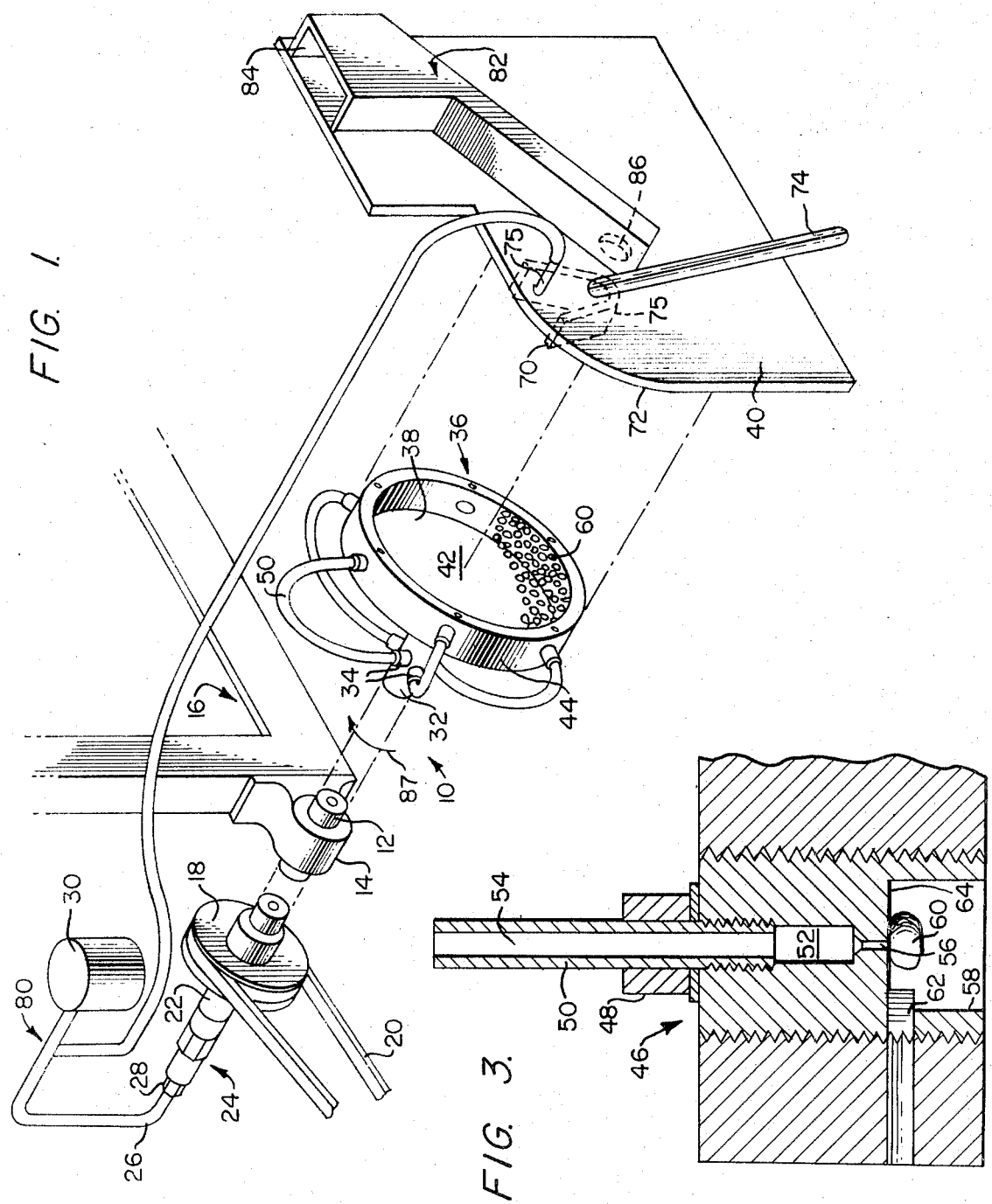
FIG. 1 is a fragmentary exploded perspective view of apparatus constructed in accordance with the teachings of the present invention.
FIG. 3 is an enlarged sectional view through one of the particle retaining cavity forming means of the invention.

The invention will be more particularly described in reference to the accompanying drawing, which for illustrative purposes show a seed metering apparatus suitable for attachment to, for example, an automatic seed planting agricultural machine. While the illustrated form of the invention shows the apparatus employed as a seed metering device. It will be recognized by those skilled in the art that the metering and conveying mechanism may be employed to meter various materials such as bearings, medicaments in pill form or to separate objects having different shapes and volumes.

In the drawing 10 generally designates the improved metering device which includes a hollow shaft 12 supported in bearing means 14 secured to a suitable frame generally designated 16. The shaft 12 has coupled thereto drive means for rotating the shaft illustrated as a pulley 18 having trained thereabout a drive belt 20 connected to a suitable prime mover which in the form of the illustrated invention may be a ground engaging wheel of a planter such that the metering device is rotated in synchronism with the forward motion of the planter.

One extended end 22 of the hollow shaft 12 receives a coupling generally designated 24 which coupling has connected thereto a conduit 26 via a non-rotating bushing 28. The extended end of the conduit 26 is connected to a pump 30 for directing a relatively low volume compressed air stream through the conduit 26 and its hollow shaft 12. The opposite end of the shaft 12 has secured thereto a spider 32 having a plurality of outlet nipples 34 communicating with the interior thereof whereby the air stream within the conduit 12 is directed to the nipples 34.

The spider or hub 32 is rigidly connected to a cylindrical drum generally designated 36 having one end wall 38 which end wall and drum 36 in cooperation with a wall 40 defines a material metering and storage zone 42. The outer peripheral surface 44 of the drum 36 is provided with a plurality of openings into each of which is fitted a bushing generally designated 46 as more clearly shown in FIGS. 2 and 3 of the drawing.

The outermost radial end of each of the bushings 46 is shaped to receive a fitting 48 and an air flow conduit 50 connects each of the fittings 48 with an appropriate fitting 34 on the spider or hub 32, whereby air is directed into each of the bushings 46 as the drum 36 is rotated by the shaft 12.

Figure 2:
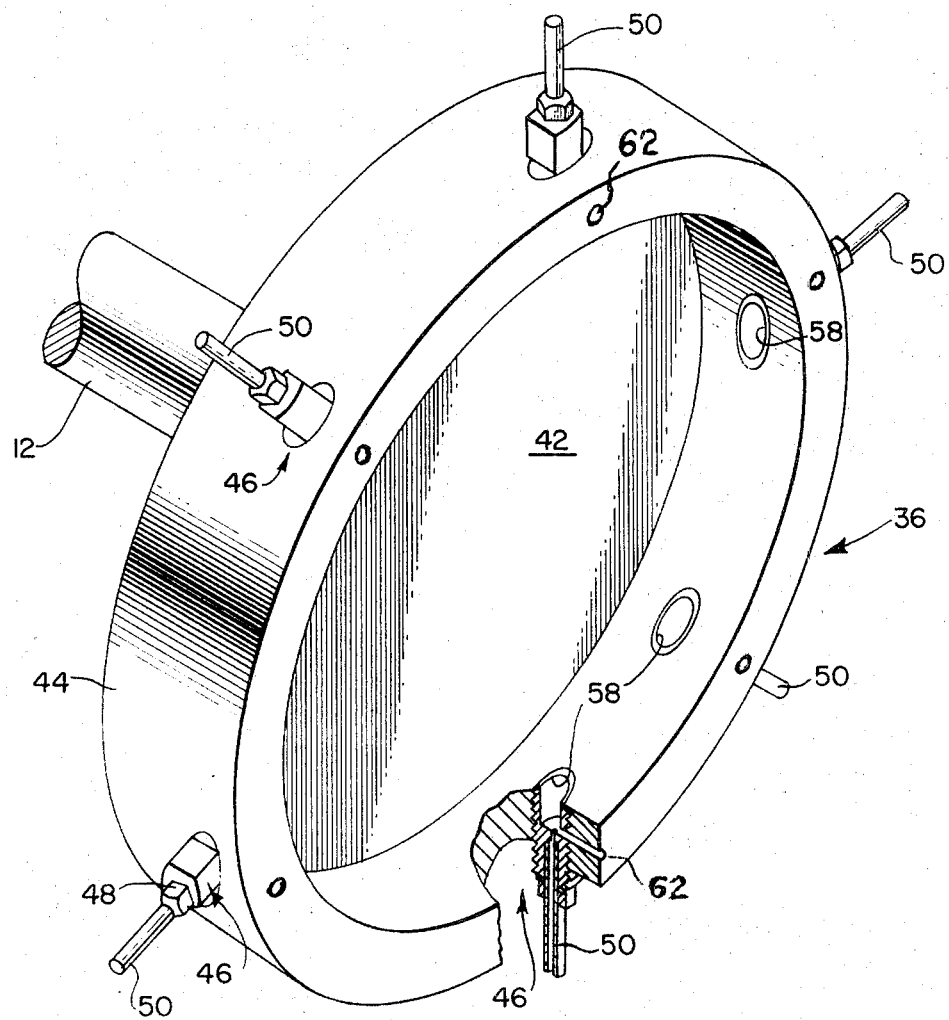
FIG. 2 is an enlarged partial sectional view of a portion of the apparatus illustrated in FIG. 1.

Now referring particularly to FIGS. 2 and 3 of the drawing each bushing 46 contains a passage 52 comprising a continuation of the bore 54 in the tube 50 which is necked down to a small passage 56. The extended end of the passage 56 terminates in an enlarged cavity 58. The cavity 58 is sized to freely receive one of the seeds 60 to be metered. Preferably the cavity 58 is of a cross sectional shape and depth such that while one of the seeds to be metered is freely received therein plural seeds cannot enter therein or oversize trash or the like will not enter the cavity. It is to be understood, however, that in the event plural seeds enter the seed cavity only one seed will be retained by virtue of the unique air-jet retaining force.

In the illustrated form of the invention release means for the seed retained in a cavity 58 is provided by a further jet of compressed air which enters the cavity via passage 62 which passage terminates adjacent the upper wall 64 of the cavity 58 whereby a blast of air entering passage 62 disrupts the effect of the high velocity low volume air stream issuing from jet outlet 56 and the seed 60 is urged from the cavity by the air stream and by gravity as will be more fully understood hereinafter.

The wall 40 forming one of the closure of members for the metering zone 42 includes an internal generally U-shaped trough or wall 70 attached to its inner face 72 such that the trough 70 is within the zine 42 and at the radially upper extent thereof in relation to the rotatable drum 36.

A seed discharge tube 74 communicates with the lower end 75 of the trough 70 whereby a seed dislodged from one of the cavities 58, when the cavity is positioned above the trough 70, will fall by a gravity and air jet induced force to the lower end 75 thereof thence from the trough via discharge tube 74.

As more clearly illustrated in FIG. 1 the wall 40 is also provided with a conduit 76 which communicates with a bore in the wall adjacent the upper end of the U-trough forming member 70. The tube 76 and its bore in wall 40 are positioned such that when, for example, upon rotation of the drum 36 when each of the lateral bores 62 therein is in its vertical position there is complete register between the bore 62 and the tube 76. The opposite end of the tube 76 is connected to the pump 30 via tee 80.

Wall 40 also supports a chute generally designated 82, the open upper end 84 of which is attachable to a supply hopper for seeds to be metered; while the lower end communicates with a bore 86 in the wall 40 whereby seeds flowing from the supply hopper pass through the chute 82 through the bore 86 into the zone 42.

In operation of the device seeds 60 are placed via the chute 82 into the lower portion of the metering zone 42 as illustrated in FIG. 1 of the drawing; the pump 30 is actuated and the shaft 12 is rotated to rotate the drum 36 relative to the fixed wall 40 and support frame 16. Seeds 60, to be metered, enter the cavities 58 when the particular cavities are at the lower portion of their path of rotation. As the seed containing cavities move upwardly in the direction of the directional arrow 87, the low volume, high velocity air stream issuing from each of the jets 56 holds a seed within the cavity in the general position illustrated in FIG. 3.

When each of the cavities containing a seed approaches the most upwardly position, adjacent trough 70 and air conduit 76, air from the conduit 76 passing through the passage 62 causes the seed 60 contained therein to dislodge and the seed falls to the lower end of the trough 70 and discharges from the tube 74. Continued rotation of the device, step by step collects, transports, singulates and meters the seeds from the discharge port.

As hereinbefore described the seed 60 retained in each of the cavities may be dislodged by means other than the secondary blast of air from conduit 76. For example the spider 32 may be associated with a rotating valve whereby when each of the tubes 50 arrive at its uppermost position above the U-shaped trough 70 air from the hollow shaft 12 is cut off to that tube and the seed is automatically released. Further it will be appreciated that mechanical picker means may be employed to dislodge the seed from its cavity 58 when the cavity is above the receiving trough 70.

From the foregoing description it will be seen that the present invention utilizes a high velocity, low volume air jet to retain a single seed or discrete object in a generally cylindrical cavity and that the air jet emanates from the center of an end wall of the cavity and is directed toward the open end parallel to the center line of the cavity. While the nature of the force tending to capture a seed or other generally spherical object in the cylindrical cavity and retain the object therein is not fully appreciated such holding force is believed to be related to the Bernoulli effect. Further as hereinabefore discussed the principle of the pneumatic seed meter disclosed herein has substantially broader application than merely an association with seed planting means and such further applications include but are not limited to seed cleaning, pill counting, pill sorting, sizing and sorting various objects and means for inspecting individual discrete particles.

The size of the chambers 58 and the velocity and volume of the air stream directed to the jet 56 would be varied according to the particular use to which the device was constructed. In the illustrated form of the invention with seed cavities each having a diameter and a depth of about five-sixteenths inch and adapted to meter soybeans and wherein diameter of each of the jet openings 56 is 15 thousandths of an inch air at pressure of about 15 to 30 pounds per square inch have proved very satisfactory. Under these conditions with the air at 25 pounds pressure air issues from each jet at about 160 in.$^3$ per minute, STP, From the foregoing description of a preferred embodiment of the present invention it will be seen that the aims and objects thereof are fully accomplished. It will be further appreciated that various modifications may be made in the specifically illustrated structures without departing from the spirit of the inventive concept disclosed herein.

We claim:

1. Apparatus for metering discrete particulate materials in a one by one successive fashion comprising, wall means defining a materials conveying cavity; means for directing a low volume, high velocity gas stream to said cavity, means for moving said wall means in a sequential manner through a zone of the particulate material wherein one of said particles is picked up by and retained in the cavity by the gas stream, and then to a discharge zone, and means for overcoming the retaining power of the gas stream to release said cavity retained particle from the cavity at the discharge zone, wherein the means for releasing said cavity retained particle comprises directing a second gas stream into the cavity substantially at right angles to the first named gas stream when the cavity is at the discharge zone.

2. Apparatus for metering discrete particulate material comprising wall means including a cylindrical wall having a plurality of generally cylindrical material conveying cavities formed radially therein; means for directing a low volume, high velocity gas stream into each of said cylindrical cavities, means for rotating said cylindrical wall for transporting said cylindrical cavities through a zone of material to be conveyed wherein one of said particles is retained in each of the cylindrical cavities by the gas streams directed thereto; a discharge hopper over which the cylindrical wall passes, and a second gas stream directing means associated with the discharge hopper for directing a stream of air sequentially into each of the cylindrical material receiving cavities to release the material contained therein.

3. The invention defined in claim 2 wherein the low volume, high velocity air stream directed to each of the particle receiving cylindrical cavities is directed thereto in a radially inward direction.

4. Apparatus for metering discrete particulate materials comprising, a cylindrical drum, an axial shaft connected to said drum, a plurality of spaced generally radial cavities formed in the inner surface of the peripheral wall of the drum, means for directing a low volume high velocity gas stream radially into each of the cavities, means for directing articles to be metered into the drum, means for rotating the drum, and means for discharging articles from each cavity as the cavities are rotated past a discharge zone.

5. The invention defined in claim 4 wherein the discharge zone is positioned adjacent the upper extremity of the rotation of the drum.

6. The invention defined in claim 5 wherein the means for discharging the articles from each cavity comprises means for directing a further gas stream into each cavity generally normal to the first mentioned gas stream.

* * * * *